United States Patent
Tokuda et al.

(10) Patent No.: US 7,303,176 B2
(45) Date of Patent: Dec. 4, 2007

(54) CONTROLLER

(75) Inventors: Ichiro Tokuda, Osaka (JP); Kenji Tsubota, Osaka (JP); Michio Yamaji, Osaka (JP); Tsutomu Shinohara, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 0 days.

(21) Appl. No.: 10/537,250

(22) PCT Filed: Oct. 31, 2003

(86) PCT No.: PCT/JP03/13977

§ 371 (c)(1),
(2), (4) Date: Jun. 1, 2005

(87) PCT Pub. No.: WO2004/051127

PCT Pub. Date: Jun. 17, 2004

(65) Prior Publication Data

US 2006/0076528 A1   Apr. 13, 2006

(30) Foreign Application Priority Data

Dec. 3, 2002   (JP) .............................. 2002-351564

(51) Int. Cl.
*F16K 31/12* (2006.01)
(52) U.S. Cl. .................... 251/58; 251/63.6; 74/110
(58) Field of Classification Search .................. 251/58, 251/63.6, 263, 331, 63.5; 74/110, 516, 519, 74/569
See application file for complete search history.

(56) References Cited

U.S. PATENT DOCUMENTS 4,270,398 A   6/1981   Arnold ........................ 74/110
4,549,719 A   10/1985  Baumann ..................... 251/280
4,856,359 A   8/1989   Krause ......................... 74/110
4,875,404 A   10/1989  Aldridge .................... 92/130 A (Continued)

FOREIGN PATENT DOCUMENTS

JP   7-139648   5/1995

OTHER PUBLICATIONS

International Search Report dated Dec. 16, 2003 (2 pages).

*Primary Examiner*—Eric Keasel
*Assistant Examiner*—John K. Fristoe, Jr.
(74) *Attorney, Agent, or Firm*—Kratz, Quintos & Hanson, LLP

(57) ABSTRACT

Force amplifying means 5 comprises a tapered member 41 extending vertically downward from the lower end of an operating rod 3, a disk member 42 provided at the upper end of a valve stem 16, and front and rear pivotal members 43, 44 arranged between the two members 41, 42 and opposed to each other with the tapered member 41 positioned therebetween, the pivotal members 43, 44 being pivotally movable about respective pivots 45, 46. Each of the pivotal members 43, 44 has a plate body 43a, 44a, an upper contact face 43b, 44b formed on an upper portion of the body and in bearing contact with a tapered face of the tapered member 41, and a lower contact face 43c, 44c formed on a lower portion of the body and bearing on the upper surface of the disk member 42. The lower contact face 43c, 44c of each pivotal member is in the form of a circular-arc cam face centered about a center line positioned away from the axis of the pivot 45, 46.

4 Claims, 2 Drawing Sheets

U.S. PATENT DOCUMENTS

| | | | |
|---|---|---|---|
| 5,018,399 A | 5/1991 | Sawatzki et al. | 74/110 |
| 5,108,069 A | 4/1992 | Tada et al. | 251/58 |
| 5,215,286 A | 6/1993 | Kolenc | 251/58 |
| 5,516,075 A * | 5/1996 | Itoi et al. | 251/58 |
| 5,556,072 A * | 9/1996 | Itoi et al. | 251/58 |
| 5,906,353 A | 5/1999 | Someya et al. | 251/58 |

* cited by examiner

CONTROLLER

TECHNICAL FIELD

The present invention relates to controllers, and more particularly to controllers suitable for use with a high-pressure fluid.

BACKGROUND ART

Conventionally known are controllers comprising a valve which is closed by biasing a valve stem downward with a spring and which is opened by driving the valve stem upward with a force given by pneumatic pressure, solenoid or the like and greater than the force of the spring, or those comprising a valve which is opened by biasing a valve stem upward with a spring and which is closed by biasing the valve stem downward with a force afforded by pneumatic pressure, solenoid or the like and greater than the force of the spring.

In the case where such a controller is used for a high-pressure fluid, there is a need to close the valve with an increased force so as to prevent the fluid from leaking. When the controller is of the type wherein a valve is closed by biasing a valve stem downward with a spring and opened by driving the valve stem upward with a force of pneumatic pressure, solenoid or the like, an increase in the elastic force of the spring entails a need to correspondingly increase the pneumatic pressure or like drive force for moving the valve stem. However, the controller has the problem that the valve closing force can not be increased as required because there is a limit on the increase in the drive force. With the controller wherein a valve is opened by biasing a valve stem upward with a spring and closed by biasing the valve stem downward with a force afforded by pneumatic pressure, solenoid or the like and greater than the force of the spring, an increase in the valve closing force entails requires an increase in the pneumatic or like downwardly biasing force. The controller of the latter type therefore has the same problem as described above.

To overcome the above problems, another controller has been proposed which comprises a valve body having a fluid channel to be opened and closed with a reciprocating upward and downward movement of a valve stem, a casing fixed to an upper portion of the valve body, an operating rod provided in an upper inside portion of the casing and movable upward and downward, drive means for moving the operating rod upward and downward, and force amplifying means provided in a lower inside portion of the casing for transmitting a force acting on the operating rod to the valve stem upon amplification (see, for example, the publication of JP-A No. 7-139648). The force amplifying means of this publication comprises a tapered roller contact member extending vertically downward from the lower end of the operating rod, a disklike roller contact member provided at the upper end of the valve stem, a pair of roller supports arranged between the two roller contact members symmetrically about the axis of the tapered member, a pair of rollable rollers rotatably mounted on upper portions of the respective roller supports and bearing against the tapered faces of the tapered roller contact member, and a pair of push rollers rotatably supported by lower portions of the respective roller supports and bearing on the upper surface of the disklike roller contact member. Each of the roller supports is supported by the casing so as to be pivotally movable about a pivot positioned closer to the axis of the tapered roller contact member than the axis of the corresponding push roller.

With the controller disclosed in the above publication, the valve closing force can be increased without increasing pneumatic pressure, the force of a spring or the drive force of a solenoid or the like, so that the controller has the advantage that a high-pressure fluid, even if used, can be reliably prevented from leaking, whereas the controller is complex in construction, comprises an increased number of components and therefore has the problem of being costly to fabricate.

An object of the present invention is to provide a controller which comprises force amplifying means for transmitting a force acting on an operating rod to a valve stem upon amplification and which is simple in construction and reduced in cost.

DISCLOSURE OF THE INVENTION

The present invention provides a controller comprising a valve body having a fluid channel openable and closable with reciprocating upward and downward movement of a valve stem, a casing fixed to an upper portion of the valve body, an operating rod provided in an upper inside portion of the casing and movable upward and downward, drive means for moving the operating rod upward and downward, and force amplifying means provided in a lower inside portion of the casing for transmitting a force acting on the operating rod to the valve stem upon amplification. The controller is characterized in that the force amplifying means comprises a tapered member extending vertically downward from a lower end of the operating rod, a disk member provided at an upper end of the valve stem, and a first and a second pivotal member arranged between the two members and opposed to each other with the tapered member positioned therebetween, each of the first and second pivotal members being pivotally movable about an axis of a pivot extending through a lower portion thereof, each of the pivotal members having a plate body, an upper contact face formed on an upper portion of the body and in bearing contact with a tapered face of the tapered member, and a lower contact face formed on a lower portion of the body and bearing on an upper surface of the disk member, the lower contact face of each pivotal member being in the form of a circular-arc cam face centered about a center line positioned away from the axis of the pivot.

With the controller of the invention, each of the pivotal members has a plate body, an upper contact face formed on an upper portion of the body and in bearing contact with a tapered face of the tapered member, and a lower contact face formed on a lower portion of the body and bearing on an upper surface of the disk member. This construction therefore eliminates the need for rollers to be in contact with the tapered member and the disk member. Since the lower contact face of each pivotal member is in the form of a circular-arc cam face centered about a center line positioned away from the axis of the pivot, the force acting on the operating rod can be transmitted to the valve stem upon amplification at a required ratio. Thus, the force amplifying means is simpler in construction and smaller in the number of components than in conventional controllers, consequently providing a controller which is equivalent to the conventional one in function but much lower in manufacturing cost.

The tapered member may be, for example, in the form of a conical or frustoconical member having a tapered end pointing downward, with a solid cylindrical portion provided on the conical portion. Alternatively, the member may be a rectangular parallelepipedal member having a triangular or trapezoidal vertical section.

With the controller described above, the first and second pivotal members may of course have respective pivots, whereas the first and second pivotal members may have respective lower portions lapping over each other, with a common pivot serving for both the pivotal members. In the latter case, the controller can be smaller in the number of pivots, much simpler in construction and smaller in the number of components.

BEST MODE OF CARRYING OUT THE INVENTION

Embodiments of the invention will be described below with reference to the drawings.

Figure 1:
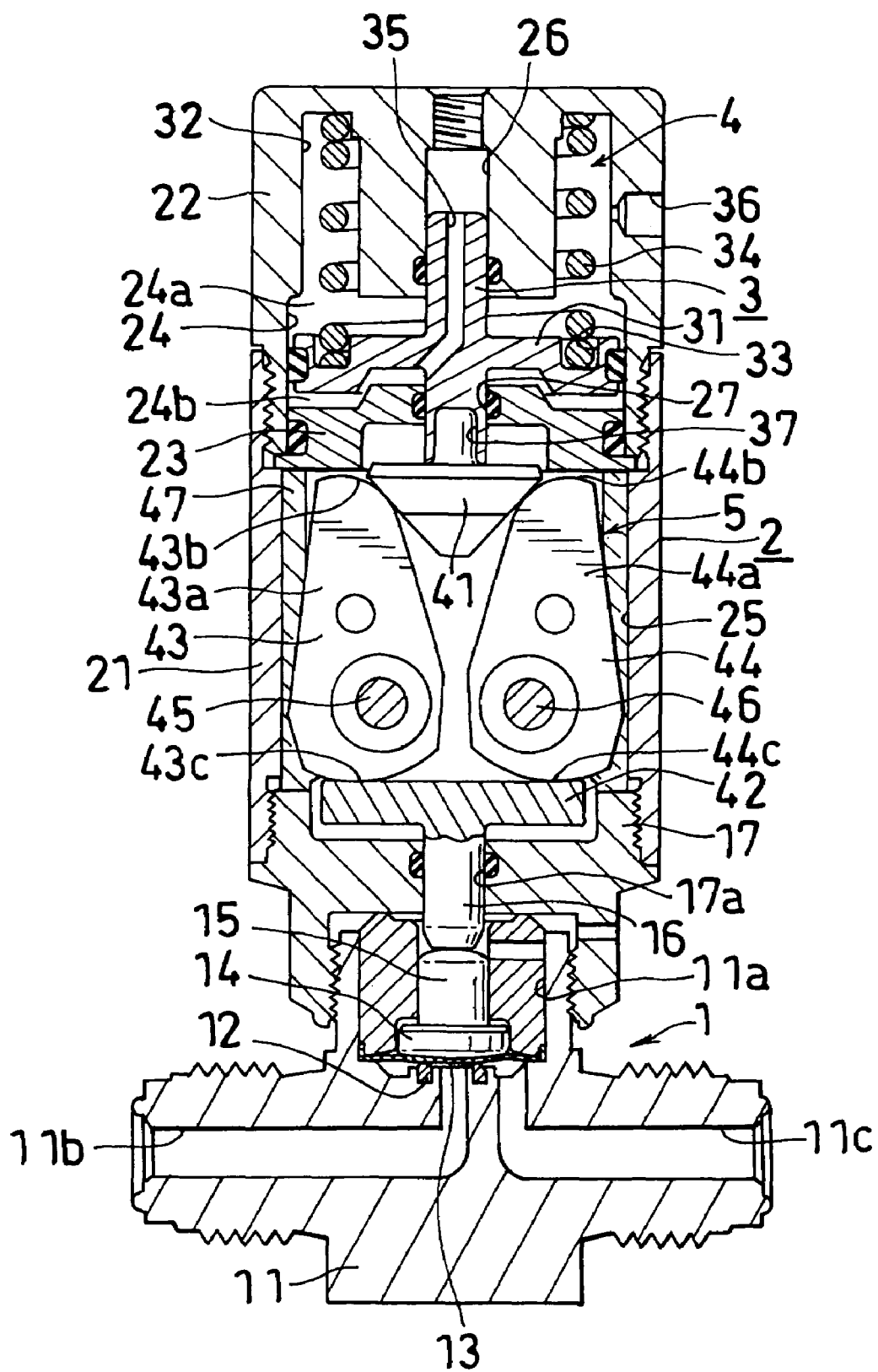
FIG. 1 is a view in vertical section of a first embodiment of controller of the invention.

The terms "upper" and "lower" as used herein refer respectively to the upper and lower sides of FIG. 1. In the following description, the term "front" refers to the left-hand side of the same drawing, the term "rear" to the right-hand side of the same drawing, and the terms "left" and "right" are used for the controller as it is seen from the rear toward the front.

FIG. 1 shows a first embodiment of controller of the invention. The controller comprises a valve body 1, a casing 2 fixed to the upper portion of the valve body 1, an operating rod 3 disposed in an upper inside portion of the casing 2 and movable upward and downward, a drive device 4 for moving the operating rod 3 upward and downward, and a force amplifying device 5 provided in a lower inside portion of the casing 2 for transmitting a force acting on the operating rod 3 to a valve stem 16.

The valve body 1 comprises a valve case 11 having a caved portion 11a with an upward opening, a fluid inlet channel 11b having a forward opening at one end thereof and having at the other end thereof an opening in the center of the bottom of the caved portion 11a and a fluid outlet channel 11c having a rearward opening at one end thereof and having at the other end thereof an opening in a bottom rear portion of the caved portion 11a, an annular valve seat 12 formed on a bottom inner peripheral edge defining the other-end opening of the inlet channel 11b, a diaphragm (valve element) 13, a diaphragm holder 14, a disk 15 having the holder 14 attached to its lower end, the above-mentioned valve stem 16 for moving the disk upward and downward, and a bonnet 17 having a valve stem guide bore 17a and screwed on the valve case 11. The valve is of the diaphragm type wherein the fluid channel 11b between the diaphragm 13 and the valve seat 12 is opened and closed by the reciprocating upward and downward movement of the valve stem 16. The diaphragm 13 comprises a plurality of thin sheets (e.g. six sheets) which includes a sheet to be in contact with the valve seat 12 and made of a material having high corrosion resistance and other sheets made of a material having a high strength and high pressure resistance. The diaphragm itself 13 has repulsive and restoring properties. When the downward force exerted by the valve stem 16 lowers, the diaphragm 13 is forced up by the pressure of fluid and the repulsive properties of the diaphragm 13 itself to open the fluid channel 11b.

The casing 2 comprises a hollow lower casing member 21 having an upward opening, and a hollow upper casing member 22 having a downward opening. A partition plate 23 is provided on the inner periphery of a joint between the upper end of the lower casing member 21 and lower end of the upper casing member 22. The upper inside portion of the cashing 2 above the partition plate 23 provides a cylinder chamber 24 which is circular in horizontal section, and the lower inside portion thereof a chamber 25 having a square horizontal section and having the force amplifying device 5 enclosed therein. The upper casing member 22 has a top wall provided with a through bore 26 formed centrally thereof and serving to guide the operating rod 3 and also to admit compressed air therethrough. An operating rod insertion hole 27 is formed in the center of the partition plate 23. The lower casing member 21 has an internally threaded lower end portion, into which an externally threaded upper end portion of the bonnet 17 is screwed, whereby the casing 2 is fixed to the valve body 1 with the bonnet 17.

The operating rod 3 has an upper end-portion slidably inserted into the through bore 26 in the top wall of the upper casing member 22 and a lower end portion slidably extending through the insertion hole 27 in the partition plate 23. The operation rod 3 is integrally provided at an intermediate portion thereof with a piston 31 disposed in the cylinder chamber 24 and slidably upward and downward. The cylinder chamber 24 is divided by the piston 31 of the operating rod 2 into an upper cylinder space 24a and a lower cylinder space 24b. A spring 34 for biasing the piston 31 downward is fittingly held in spring retaining recessed portions 32, 33 formed respectively in the lower surface of top wall of the upper casing member 22 and in the upper surface of the piston 31 of the operating rod 3. The rod 3 has a compressed air inlet passageway 35 having one end communicating with the through bore 26 of the upper casing member 22 and the other end communicating with a lower cylinder space 24b. An air vent 36 is formed in the peripheral wall of the upper cylinder member 22 for releasing air from inside the upper cylinder space 24a therethrough when the piston 31 ascends. A cavity 37 having a circular cross section and downward opening is formed in the lower end of the operating rod 3.

The drive device 4 for moving the operating rod 3 upward and downward consists mainly of the piston 31, spring 34, cylinder chamber 24, and compressed air inlet passageway 35. The piston 31 is biased downward at all times by the spring 34. Compressed air admitted into the cylinder chamber 24 through the inlet passageway 35 drives the piston 31 upward. The force acting on the piston 31 is transmitted to the operating rod 3 to drive the rod 3 upward or downward.

The force amplifying device 5 comprises a tapered member 41 extending vertically downward from the lower end of the operating rod 3 and integral therewith, a disk member 42 integral with the upper end of the valve stem 16, a pair of front and rear pivotal members 43, 44 arranged between the two members 41, 42 symmetrically about the axis of the tapered member 41, front and rear pivots 45, 46 extending in the left-right direction, i.e., laterally of the controller, and each provided at a lower portion of the corresponding pivotal member, and a retainer 47 fixedly provided inside the lower casing member 21 and supporting the front and rear pivots 45, 46.

The tapered member 41 is made from a rectangular parallelepiped by giving a slanting face to each of its front and rear sides. The slanting faces make an angle, for example, of 90 deg therebetween. An upwardly projecting shank provided on the top of the tapered member 41 is tightly fitted into a cavity 37 formed in the lower end of the rod 3, whereby the tapered member 41 is joined to the operating rod 3. The disk member 42 has a circular flat upper surface.

Each of the pivotal members 43, 44 has a platelike body 43a (44a), an upper contact face 43b (44b) formed on an upper portion of the body 43a (44a) and in bearing contact with the corresponding tapered face of the tapered member 41 and a lower contact face 43c (44c) formed on a lower portion of the body 43a (44a) and bearing on the upper surface of the disk member 42. The lower contact face 43c (44c) of each pivotal member 43 (44) is in the form of a circular-arc cam face centered about a center line which is parallel to the axis of the corresponding pivot 45 (46) and positioned (laterally outwardly) a larger distance away from the axis of the tapered member 41 than the axis of the pivot 45 (46). Accordingly, when each of the front pivotal members 43, 44 pivotally moves, the distance between the portion of the lower contact face 43c (44c) in contact with the disk member 42 and the axis of the pivot 45 (46) varies to alter the force with which the lower contact face 43c (44c) pushes the disk member 42.

The front (rear) pivot 45 (46) is fittingly inserted through a hole formed in a lower end portion of the front (rear) pivotal member 43 (44) and has its opposite left and right ends held by respective bearings (not shown) on the retainer 47, whereby the pivot 45 (46) is rotatably supported by the lower casing member 21 while being prevented from moving forward, rearward, upward, downward, leftward and rightward, rendering the pivotal member 43 (44) pivotally movable about the horizontal axis of the corresponding pivot 45 (46). Instead of using bearings for supporting the pivot 45 (46), the pivot 45 (46) may be loosely, i.e., rotatably, fitted into holding holes formed in the retainer 47.

FIG. 1 shows the fluid channel as closed, with the operating rod 3 in a lowered position by being biased downward with the elastic force of the spring 34. In this state, the upper contact faces 43b, 44b of the front and rear pivotal members 43, 44 are positioned away from each other, with the lower contact faces 43c, 44c moved toward each other. The elastic force of the spring 34 is transmitted to the disk member 42 through the upper contact faces 43b, 44b, the bodies 43a, 44a of the front and rear pivotal members 43, 44 and the lower contact faces 43c, 44c to push the valve stem 16 downward. The force is delivered to the diaphragm 13 to close the inlet channel 11b.

Suppose the force acting on the operating rod 3 is F, and half of the angle between the tapered faces of the tapered member 41 is $\alpha$. Acting on the upper contact face 43b (44b) of each pivotal member 43 (44) is a force perpendicular to the corresponding tapered face. The force G acting on the pivotal member 43 (44) is $G = F \div 2 \sin \alpha$. The force G acting on the upper contact face 43b (44b) of the pivotal member 43 (44) is transmitted to the disk member 42 through the pivotal member body 43a (44a) and the lower contact face 43c (44c). Suppose the distance between the axis of the pivot 45 (46) and the center line of circular-arc of the upper contact face 43b (44b) is C, the angle a line through the axis of the pivot 45 (46) and the center line of circular-arc of the upper contact face 43b (44b) makes with the corresponding tapered face of the tapered member 41 is $\gamma$, the horizontal distance between the axis of the pivot 45 (46) and the center of circular-arc of the lower contact face 43c (44c) is $\delta$, and the downward pushing force exerted by the lower contact face 43c (44c) on the disk member 42 is N. Then there is the relationship of $N \times \delta = G \times \cos \gamma \times C$. Accordingly the downward pushing force exerted by both the front and rear pivotal members 43, 44 on the disk member 42, i.e., the downward pushing force on the valve stem 16, is $2N = F \times \cos \gamma \times C \div \sin \alpha \div \delta$. The force acting on the operating rod 3 can be transmitted to the valve stem 16 upon amplification at a desired ratio by giving suitable values to $\alpha$, $\gamma$, $\delta$ and C.

When compressed air is sent into the through bore 26 of the upper casing member 22 of the controller of the first embodiment, the air flows through the air inlet passageway 35 of the operating rod 3 and is supplied to the lower cylinder space 24b of the cylinder chamber 24. This causes the pneumatic pressure to exert an upward force on the piston 31. By making this force greater than the downward force afforded by the spring 34, the operating rod 3 is driven upward. With this movement, the front and rear upper contact faces 43b, 44b are moved toward each other, pivotally moving the front and rear pivotal members 43, 44 to move the lower contact faces 43c, 44c away from each other. Consequently the distance from the portion of contact of each lower contact face 43c (44c) with the disk member 42 to the axis of the corresponding pivot 45 (46) diminishes, eliminating the downward pushing force exerted by each lower contact fact 43c (44c) on the valve stem 16, whereupon the diaphragm 13 is forced up with the pressure of fluid and by the repulsive properties of the diaphragm 13 itself to open the fluid channel 11b.

Figure 2:
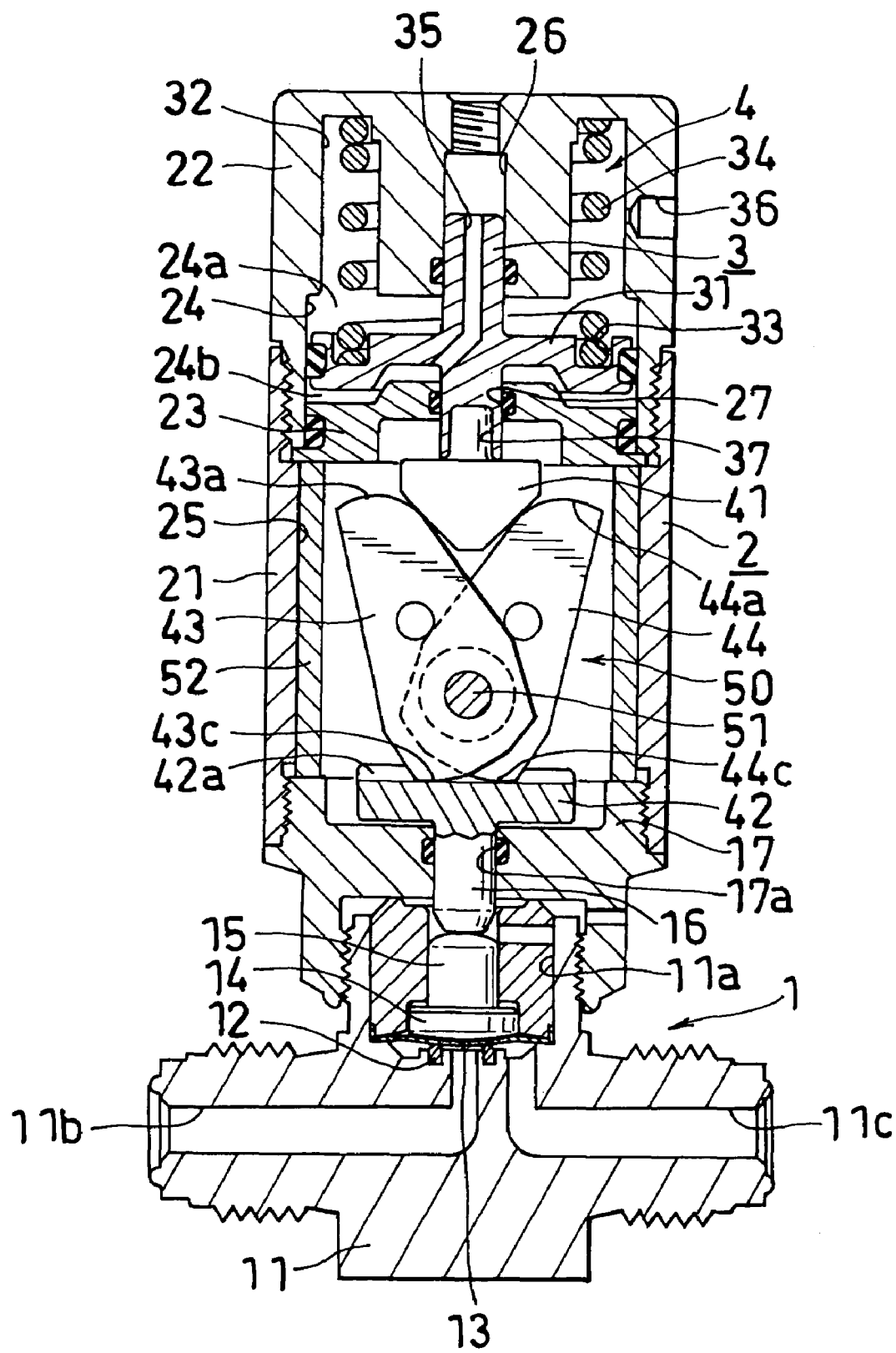
FIG. 2 is a view in vertical section of a second embodiment of controller of the invention.

FIG. 2 shows a second embodiment of controller of the invention. This embodiment differs from the first embodiment with respect to the pivotal members and the pivots of the force amplifying device and accordingly in respect of the retainer. Throughout the drawings concerned, like parts are designated by like reference numerals and will not be described repeatedly.

A force amplifying device 50 comprises a tapered member 41 extending vertically downward from the lower end of the operating rod 3 and integral therewith, a disk member 42 integral with the upper end of the valve stem 16, a pair of front and rear pivotal members 43, 44 arranged between the two members 41, 42 symmetrically about the axis of the tapered member 41, a pivot 51 extending in the left-right direction, i.e., laterally of the controller, having the pivotal members 43, 44 joined thereto at their lower portions which are lapped over each other and serving for both the pivotal members 43, 44 in common, and a retainer 52 fixedly provided inside the lower casing member 21 and supporting the common pivot 51 thereon.

The lower contact face 43c (44c) of each pivotal member 43 (44) is in the form of a circular-arc cam face centered about a center line which is parallel to the axis of the common pivot 51 and is positioned away from the axis of the common pivot 51 and away from the axis of the tapered member 41. Accordingly, when each of the front and rear pivotal members 43, 44 pivotally moves, the distance between the portion of the lower contact face 43c (44c) in contact with the disk member 42 and the axis of the pivot 51 varies to alter the force with which the lower contact face 43c (44c) pushes the disk member 42.

The common pivot 51 is fittingly inserted through a hole formed in a lower end portion of the front (rear) pivotal member 43 (44) and has its opposite ends held by respective bearings (not shown) on the retainer 52, whereby the pivot 51 is rotatably supported by the lower casing member 21 while being prevented from moving forward, rearward, upward, downward, leftward and rightward, rendering the pivotal member 43 (44) pivotally movable about the horizontal axis of the common pivot 51. Incidentally the front and rear pivotal members 43, 44 may each be one in number, while a pair of front pivotal members 43 are arranged as positioned at left and right according to the present embodiment, with the rear pivotal member 44 positioned between the pair of front members 43 so that one of each front member 43 and the rear member 44 guide the other. The disk member 42 is provided at the left and right edges thereof with respective projections 42a for preventing the lower ends of the pivotal members 43, 44 from moving laterally outward.

FIG. 2 shows the fluid channel as closed, with the operating rod 3 in a lowered position by being biased downward with the elastic force of the spring 34. In this state, the upper contact faces 43b, 44b of each front pivotal member 43 and the rear pivotal member 44 are positioned away from each other, with the lower contact faces 43c, 44c moved toward each other. The elastic force of the spring 34 is transmitted to the disk member 42 through the upper contact faces 43b, 44b, the bodies 43a, 44a of the front and rear pivotal members 43, 44 and the lower contact faces 43c, 44c to push the valve stem 16 downward. The force is delivered to the diaphragm 13 to close the inlet channel 11b.

When compressed air is sent into the through bore 26 of the upper casing member 22 of the controller of the second embodiment, the air flows through the air inlet passageway 35 of the operating rod 3 and is supplied to the lower cylinder space 24b of the cylinder chamber 24. This causes the pneumatic pressure to exert an upward force on the piston 31. By making this force greater than the downward force afforded by the spring 34, the operating rod 3 is driven upward. With this movement, the front and rear upper contact faces 43b, 44b are moved toward each other, pivotally moving each front pivotal member 43 and the rear pivotal member 44 to move the lower contact faces 43c, 44c away from each other. Consequently the distance from the portion of contact of each lower contact face 43c (44c) with the disk member 42 to the axis of the common pivot 51 diminishes, eliminating the downward pushing force exerted by each lower contact fact 43c (44c) on the valve stem 16, whereupon the diaphragm 13 is forced up with the pressure of fluid and by the repulsive properties of the diaphragm 13 itself to open the fluid channel 11b.

The operating rod 3 is driven with pneumatic pressure for opening the fluid channel according to the foregoing two embodiments, whereas the operating rod 3 can alternatively be operated, for example, by a solenoid. It is also possible to bias the operating rod upward with a spring, to bias the valve stem downward with a force greater than the force of the spring using pneumatic pressure, a solenoid or the like to holed the valve closed, and to remove the force given by the pneumatic pressure, solenoid or the like to open the valve.

INDUSTRIAL APPLICABILITY

The controller of the invention has force amplifying means for transmitting a force acting on an operating rod to a valve stem upon amplification, is simple in construction and reduced in manufacturing cost, and is therefore suitable for use with a high-pressure fluid.

The invention claimed is:

1. A controller comprising
a valve body having a fluid channel openable and closable with reciprocating upward and downward movement of a valve stem,
a casing fixed to an upper portion of the valve body,
an operating rod provided in an upper inside portion of the casing and movable upward and downward,
drive means for moving the operating rod upward and downward, and
force amplifying means provided in a lower inside portion of the casing for transmitting a force acting on the operating rod to the valve stem upon amplification,
the controller being characterized in that the force amplifying means comprises
a tapered member extending vertically downward from a lower end of the operating rod,
a disk member provided at an upper end of the valve stem, and
a first and a second pivotal member arranged between the two members and opposed to each other with the tapered member positioned therebetween, each of the first and second pivotal members being pivotally movable about an axis of a pivot extending through a lower portion thereof, each of the pivotal members having a plate body,
an upper contact face formed on an upper portion of the plate body and in direct bearing contact with a tapered face of the tapered member, the upper contact face of each pivotal member being in the form of a circular-arc face, and
a lower contact face formed on a lower portion of the plate body and direct bearing on an upper surface of the disk member, the lower contact face of each pivotal member being in the form of a circular-arc cam face centered about a center line positioned away from the axis of the pivot.

2. A controller according to claim 1 wherein the tapered member is made from a rectangular parallelepiped by giving a slanting face to each of a front and rear side of the tapered member.

3. A controller according to claim 1 wherein the operation rod is integrally provided at a lower end portion thereof with the tapered member and is integrally provided at an intermediate portion thereof with a piston disposed in a cylinder chamber and slidably upward and downward.

4. A controller comprising
a valve body having a fluid channel openable and closable, with reciprocating upward and downward movement of a valve stem,
a casing fixed to an upper portion of the valve body,
an operating rod provided in an upper inside portion of the casing and movable upward and downward,
drive means for moving the operating rod upward and downward, and
force amplifying means provided in a lower inside portion of the casing for transmitting a force acting on the operating rod to the valve stem upon amplification,
the controller being characterized in that the force amplifying means comprises
a tapered member extending vertically downward from a lower end of the operating rod,
a disk member provided at an upper end of the valve stem, and
a first and a second pivotal member arranged between the two members and opposed to each other with the tapered member positioned therebetween, each of the first and second pivotal members being pivotally movable about an axis of a pivot extending through a lower portion thereof, each of the pivotal members having a plate body,
an upper contact face formed on an upper portion of the body and in bearing contact with a tapered face of the tapered member, and a lower contact face formed on a lower portion of the body and bearing on an upper surface of the disk member, the lower contact face of each pivotal member being in the form of a circular-arc cam face centered about a center line positioned away from the axis of the pivot, wherein the first and second pivotal members have respective lower portions lapping over each other, and a common pivot serves for both the pivotal members.

* * * * *